United States Patent
Hollingsworth et al.

[11] Patent Number: 6,146,436
[45] Date of Patent: Nov. 14, 2000

[54] CARTRIDGE FILTER

[75] Inventors: Anthony Hollingsworth, Birkenau; Peter Pfeuffer, Ketsch; Jörg Sievert, Weinheim; Thomas Schroth, Bobenheim; Antje Rudolph, Unterflockenbach, all of Germany

[73] Assignee: Firma Carl Freudenberg, Weinheim, Germany

[21] Appl. No.: 09/050,151

[22] Filed: Mar. 30, 1998

Related U.S. Application Data

[63] Continuation-in-part of application No. 08/843,723, Apr. 21, 1997, abandoned, which is a continuation of application No. 08/512,240, Aug. 7, 1995, abandoned.

[30] Foreign Application Priority Data

Aug. 5, 1994 [DE] Germany .................. 44 27 817

[51] Int. Cl.$^7$ ............................................. B01D 46/52
[52] U.S. Cl. .................. 55/486; 55/487; 55/498; 55/521; 55/527; 55/528; 210/491; 210/493.5; 210/467.01
[58] Field of Search .............................. 95/273, 286, 287; 55/498.521, 528, 527, 486, 487; 210/493.4, 488, 493.5, 491–496, 500.1, 497.01; 428/296, 284, 297, 298, 301, 303

[56] References Cited

U.S. PATENT DOCUMENTS

| | | | |
|---|---|---|---|
| 3,201,926 | 8/1965 | Harrington | 55/486 |
| 3,400,520 | 9/1968 | Sakurai | 55/528 |
| 4,478,620 | 10/1984 | Tamura | 55/486 |
| 4,961,974 | 10/1990 | Jones | 55/528 |
| 4,976,858 | 12/1990 | Kadoya | 55/486 |
| 4,983,193 | 1/1991 | Tani et al. | 55/528 |
| 5,279,731 | 1/1994 | Cook et al. | 55/527 |
| 5,283,106 | 2/1994 | Seiler et al. | 55/528 |
| 5,284,704 | 2/1994 | Kochesky et al. | 55/528 |
| 5,306,321 | 4/1994 | Osendorf | 55/521 |
| 5,397,632 | 3/1995 | Murphy, Jr. et al. | 55/521 |

FOREIGN PATENT DOCUMENTS

| | | | |
|---|---|---|---|
| 4304036 | 5/1994 | Germany . | |
| 55-99315 | 7/1980 | Japan | 55/486 |
| 2-258007 | 10/1990 | Japan | 55/528 |

*Primary Examiner*—Duane S. Smith
*Attorney, Agent, or Firm*—Kenyon & Kenyon

[57] ABSTRACT

A cartridge filter having a cylindrical filter element, which is pleated parallel to its axis and is made of a layered non-woven unitary fabric. The fabric is permeable by air flow in the radial direction and is used in fresh air-supply filtration with initial pressure losses of less than 300 Pa at air flow rates through the filter medium of less than 250 m$^3$/m$^2$h. The non-woven fabric has a mass per unit area of 100 to 500 g/m$^2$, and a thickness of 1.5–7.0 mm mm. It is made of layered staple fibers of a titer of 0.1 to 50 decitex, which are bonded by a thermally softened binding agent. A bottom layer bordering on the downstream side is contained in the non-woven fabric, having a thickness of 10 to 60% of the overall thickness, and is compressed two to ten times as much as a top layer bordering on the upstream flow side having a thickness of 10–60% of the overall thickness. One or more intermediate layers link the top and bottom layers to one another. The fabric is unitary in structure, in that it is not a composite formed of separate layers which must be subsequently joined together.

17 Claims, 1 Drawing Sheet

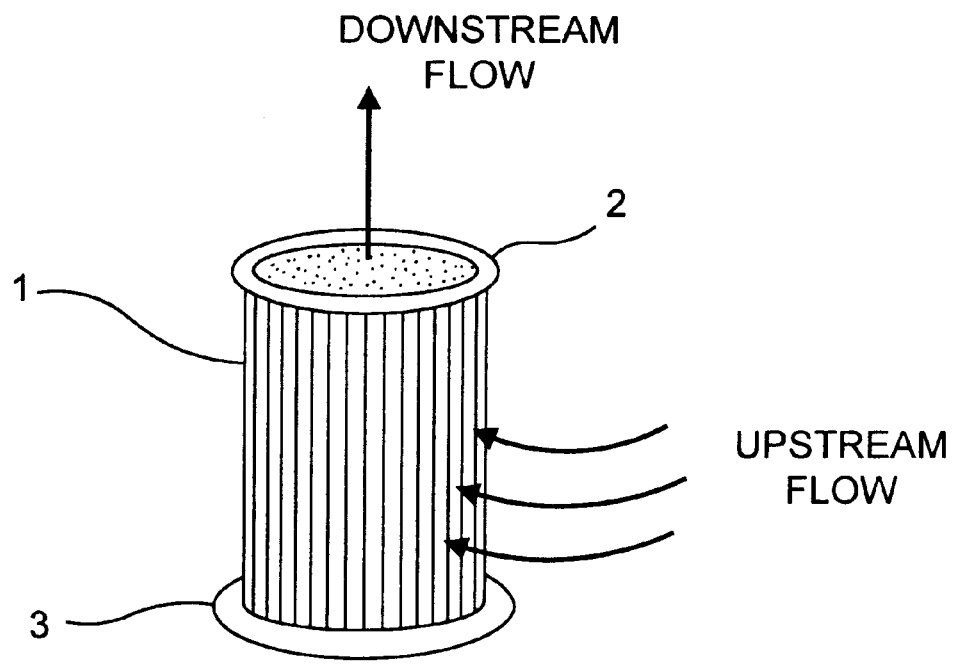
F I G. 1
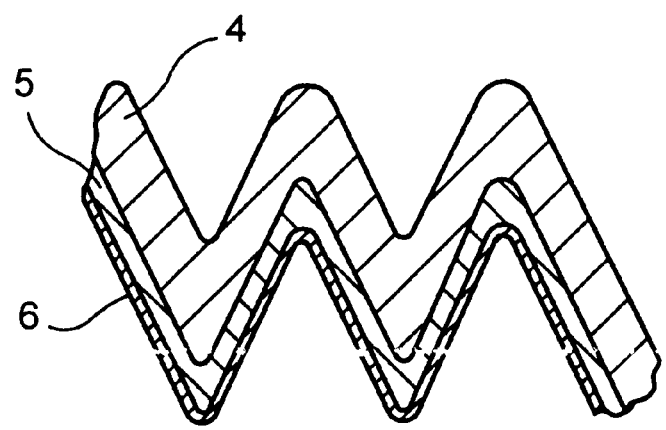
F I G. 2

CARTRIDGE FILTER

RELATED APPLICATION

This application is a continuation in part of application Ser. No. 08/843,723, filed on Apr. 21, 1997, which was a continuation of application Ser. No. 08/512,240, filed on Aug. 7, 1995. Each of these prior applications is now abandoned.

BACKGROUND OF THE INVENTION

The present invention relates generally to a cartridge filter and, more particularly, to a cylindrical cartridge filter having a pleated filter element made of a non-woven fabric that can be traversed by a stream of air in the radial direction. The filter is generally used in situations calling for initial pressure losses of less than 300 Pa at an air flow 250 $m^3/m^2h$.

In known filters of this type, the cartridge contains a filter medium that is made of one or more layers, each having a homogeneous structure, wherein the upstream layer in regard to the air flow is generally very dense and has extremely small pores. Due to the pleating and the thinness of the medium, the filter has a comparatively large surface area, so that the measured pressure drop of the filter cartridge is very low. It is quite common for such cartridge filters to contain as much as 15 to 20 $m^2$ of filter media. Such a cartridge filter is generally only useful for extracting dust, where high concentrations (greater than 1 $mg/m^3$) of a relatively coarse dust (larger than 1 micrometer) are present, such as in industrial dust control applications. The dust particles that are separated out of the air in the course of purification during normal use collect as a removable filter cake on the dense upstream (incident flow) side of the cartridge filter.

Since, as a rule, the dust concentration in the fresh air filtration is less than 1 $mg/m^3$, and the air contains large concentrations of fine dust particles (smaller than 0.5 microns), the extremely small pores of the filter medium become quickly clogged by depth filter effects and a removable dust cake can not build up on the surface of the medium. The net effect is to make it impossible to effectively clean the filter by normal reverse air flow or pulse jet cleaning. This leads to a rapid rise in pressure loss after a short period of use.

It is also known, with respect to air filtration, to use so-called "deep-bed" filters. These filters comprise soft non-woven fabric mats of a thickness of 8 to 100 mm, whose porous structure becomes continuously denser in the direction of the clean (downstream) air side. As a result, the dust particles to be separated out of the air to be purified are able to penetrate to varying depths dependent on particle size, into the inside of the filter mats, until they are held fast therein. The pressure drop that ensues during normal operational use is nearly constant over long periods of time. However, because of their considerable voluminousness and softness, filter mats of this type can not be pleated. Hence, filter mats required for a given volume of air, have a comparatively large upstream surface area, which makes it necessary to provide especially large aggregates for their installation. The reverse pulse jet cleaning of such filters is not possible. For this reason, depth filters are primarily used in the air supply filtration of air conditioning systems (HVAC).

German Patent 4304036 discuses the construction of a cartridge filter. In particular, it shows a pleated non-woven fabric that is transformed into a cylindrical shape and is fixed in a holding device. The non-woven fabric used in manufacturing the known cartridge filter had always been structured homogeneously over its entire cross-section. Customary surface-filter media have a porosity of less than 85%. A non-woven fabric having a porosity greater than 90% and a thickness greater than 1.5 mm, either cannot be pleated at all or only with considerable difficulty. For the most part, during normal operational use, it is too soft to oppose the oncoming flow of air with the necessary static resistance. The resultant plastic deformations cause the folds to rest on one another and the pressure losses to suddenly rise. One can counteract this deformation by backing the pleated media with reinforcement materials (wire mesh fabric or non-woven carriers), but thisentails considerable expense.

It is known to make a laminate composite filter from several discrete, separate layers of non-woven fabrics. Such an approach is set forth in U.S. Pat. No. 5,282,106 to Seiler et al. However, this approach requires that the discrete layers be joined to form the composite, and the joining process reduces the effective surface area of the filter, thereby compromising the basic efficacy of the filter for a given size.

The present invention is directed to the development of a pleated cartridge filter that affords a pressure drop that is essentially unchanging over long periods of use and which is suited for an application in the area of fresh air filtration.

SUMMARY OF THE INVENTION

In the cartridge filter of the invention, a non-woven fabric is used having a mass per unit area of 100–500 $g/m^2$, and an overall thickness, measured according to DIN 53 855, of 1.5 to 7.0 mm. DIN 53 855 describes the method for determining the thickness of textile fabrics. These fabrics are compressible, which means that it is important to comply with the designated test conditions when taking measurements. The non-woven fabric used in accordance with the invention comprises staple fibers of a titer of 0.1 to 50 decitex which are blended and arranged together in layers. The individual fibers are bonded together by a thermally softened binding agent. A bottom layer contained in the nonwoven fabric (which borders on the downstream side) has a thickness that constitutes 10 to 60% of the overall thickness, and is compressed three to six times as much as a top layer bordering on the incident (upstream) side and having a thickness of 10 to 60% of the overall thickness. (In the context of this invention, the term "layer" with respect to the top and bottom layers is understood to mean a zone of generally uniform density or fiber composition that is formed of fibers that are laid down generally concurrently with the fibers of the other layer.) The remainder of the thickness of the filter is made up by an intermediate transition zone, linking the bottom and top layers to one another. (This layer is an artifact of the manufacturing process.) In other embodiments, additional such layers of varying density may be employed.

The resulting material can be pleated, i.e., folded without the use of additional reinforcement measures, such as the supplementary use of a wire mesh fabric or of a nonwoven backing fabric. The individual folds, at a depth of 30 to 60 mm, may have a maximum mutual clearance of 10 to 25 mm.

The benefit of such an arrangement is that the non-woven fabric is not only well suited for pleating, but moreover, has the capability of separating out the dust particles from the air and of storing them by distributing them by size over the entire cross-section of the filter fabric. When used in a cartridge filter, this makes it possible to achieve a comparatively low pressure drop over long periods of time, and moreover, to make available an active filter surface of a size previously not thought possible in an especially small space.

A cartridge filter constructed according to the principles of this invention affords considerably prolonged service life. It can be used to replace prior art filters without necessitating any retrofitting of the filter size or housing employed.

With respect to manufacturing the non-woven fabric, all known staple fibers can be used, although synthetically produced fibers are preferred. Polyester fibers have proven to be especially advantageous. They preferably constitute 60% by weight of the fiber content.

Any known form of the thermally softened binding agent can be used to hold the fibers together. As a binding agent, it is preferable to use binding thermoplastic fibers, e.g., bi-component fibers, which have a high melting-point or infusible core and a sheath capable of being thermally softened.

The present invention includes a method to produce pleated non-woven fabrics having a thickness of more than 1.5 mm, as well as a porosity of more than 90%, without using any reinforcement materials. (In the present invention, porosity is defined to be the interstitial volume of the fabric relative to the total volume taken up by the fabric.) The method further provides for transforming the fabrics into a cylindrical shape, and in fixing them in a holding device so as to prevent any plastic deformations to occur that would adversely affect usability during normal operational use. The cartridge filter can be used in fresh air filtration systems, and affords initial pressure losses of less than 300 Pa at air flow rates through the non-woven fabric of less than 250 m$^3$/m$^2$h.

In one embodiment of the method, a sheet of staple fibers and a thermally softenable binding agent are provided as starting materials. The material is heated, softened, and the fibers are compressed with a calendar on one of its sides. The sheet is pleated and formed into a cylindrical shape, and the filter is then fixed to a holding device.

BRIEF DESCRIPTION OF THE DRAWINGS

For a more complete understanding of this invention, reference should now be made to the embodiments illustrated in greater detail in the accompanying drawings and described below. In the drawings:

FIG. 1 is a perspective view of a cylindrically shaped cartridge filter constructed according to the principles of the invention; and FIG. 2 is a cross sectional view of a portion of the fabric filter material used in FIG. 1.

DETAILED DESCRIPTION

The invention will be further described in terms of an example. The cylindrical filter cartridge (FIG. 1) comprises a cylindrical filter element 1 that is pleated parallel to the cylinder axis. The filter element 1 consists of a layered non-woven fabric permeable to flow in the radial direction. The formed fabric has a mass per unit area of 300 g/m$^2$, and an overall thickness (as measured according to DIN 53 855) of 3 mm and (in this example), comprises two differing layers of staple fibers. The individual fibers are bonded to one another by a thermally softened binding agent. The non-woven fabric has a bottom layer 6 bordering on the downstream side of the filter that has a thickness which is 30% of the overall thickness. The fabric further comprises a top layer 4 bordering the upstream side. The bottom layer 6 is compressed five times as much as the top layer 4. Layers 4 and 6 are separated from another by an intermediate layer 5 of transitional density.

The first fiber layer, which essentially forms the top layer 4, is comprised of 70% by weight of polyester fibers having a titer of 3.3 decitex and 30% by weight of bi-component fibers of a polyester base with a titer of 5.5 decitex. The second fiber layer forming the bottom layer 6 is comprised of 40% by weight of polyester fibers having a titer of 1.7 decitex and 60% by weight of bi-component fibers of a polyester base with a titer of 2.2 decitex. The first and the second fiber layer each have a weight of 150 g/m$^2$. The total weight is 300 g/m$^2$.

These layers are formed concurrently. The two layers are layered one on top of the other using a cross-layering apparatus and subsequently conveyed with the assistance of a wire screen into a thermo-fusion oven. In the thermo-fusion oven, a flow of hot air of a temperature of 180° C. is drawn through the two layers jointly. On the bottom side is an exhaust fan, through which the hot air is removed.

The resulting filter mat is subsequently compressed with the aid of a band calendar to a thickness of 3 mm. In so doing, the bottom layer 6, which during normal operational use forms the downstream side of the filter mat, is heated to a temperature of 130° C. to obtain the desired compression on the bottom side only. The period of dwell in the calendar is approximately 16 seconds. The tension of the band is approximately 2.5 bar.

The flexural rigidity (S) of the resulting non-woven filter is measured in accordance with DIN 53 350. DIN 53 350 describes the determination of flexural strength by the bending of a strip that is gripped on one side. The moment of flexural strength is measured at various bending angles. The flexural strength is 24 N·m$^2$ at a 10° bending angle, and 37 N·m$^2$ at a 20° bending angle.

The permeability to air is measured according to DIN 53 887. (DIN 53 887 provides a standard for assessing the permeability of a material to air, i.e. a measure of the ease with which a textile material, at a given differential pressure, allows air to flow through.) In the present example, the air permeability is 100 Pa at 600 1/m$^2$s, and the porosity is 92.7%.

The finished non-woven fabric is subsequently converted by a knife-edge pleating machine into a pleated filter-element with folds having a depth of approximately 48 mm.

Four square meters of the pleated material are subsequently transformed into a cylindrical shape having an outer diameter of 327 mm and an axial length of 600 mm. The resulting form is then covered sealed in a dust-proof manner at the two ends with a lid 2 and a bottom rim 3 made of plastic. The resulting filter cartridge is then ready for use.

The performance afforded by the filter in this example is as follows:

Given a volumetric flow of air to be purified of 1000 m3/h, an initial pressure drop of 110 Pa results. It can be used without any problems until a final pressure drop of 600 Pa is reached. In applications in fresh air filtration for air-conditioning systems (HVAC), this normally does not occur until after one year.

In the preferred embodiment, the filter fabric is unitary in structure, in that it is not a composite formed of separate layers which must be joined together (e.g., with a hot melt adhesive at the interface of the discrete layers). Consequently, the efficacy of the filter is not compromised by measures which would otherwise be necessary to join the discrete layers into a composite.

What is claimed is:

1. A cartridge filter containing non-woven fabric converted into a cylindrical shape for use as the filter element, the filter element being permeable in the radial direction and comprising:

layered staple fibers of a titer of 0.1 to 50 decitex, said fibers being bonded together by a thermally softenable binding agent;

a top layer bordering on the upstream side of the filter and having a thickness of between 10%–60% of the overall thickness of the non-woven fabric;

a bottom layer bordering on the downstream side of the filter having a thickness of between 10% to 60% of the overall thickness of the non-woven fabric, said bottom layer being compressed between two to ten times the top layer, the non-woven fabric having an overall mass per unit area of 100 to 500 g/m², and an overall thickness, as measured according to DIN 53 855, of 1.5–7.0 mm; and one or more transition zones intermediate the top and bottom layers, the transition zone(s) being formed integral with the top and the bottom layers so that the layers need not be separately joined together, wherein the top layer, the bottom layer, and the transition zone comprise 100% of the thickness of the filter element, wherein the non-woven fabric is cylindrical in shape and is pleated parallel to the cylindrical axis of its shape, and wherein the filter element is useable in air-supply filtration with initial pressure losses of less than 300 Pa at air flow rates through the filter medium of less than 250 m³/m²h.

2. A filter as set forth in claim 1, wherein the staple fibers have a titer of 0.5 to 6 decitex.

3. A filter as set forth in claim 1, wherein the non-woven fabric has a thickness of 2.5–4.5 mm.

4. A filter as set forth claim 1, wherein the bottom layer is compressed five to seven times as much as the top layer.

5. A filter as set forth claim 3, wherein the bottom layer is compressed five to seven times as much as the top layer.

6. A filter as set forth in claim 1, wherein the fibers comprise polyester fibers.

7. A filter as set forth in claim 4, wherein the fibers comprise polyester fibers.

8. A filter as set forth in claim 6, wherein the polyester fibers amount to at least 60% by weight of the fibers.

9. A filter as set forth in claim 1, wherein binding agents in the form of binding thermoplastic fibers are used.

10. A filter as set forth in claim 8, wherein binding agents in the form of binding thermoplastic fibers are used.

11. A filter as set forth in claim 1, wherein the binding agents are in the form of bicomponent fibers.

12. A filter as set forth in claim 6, wherein the binding agents are in the form of bicomponent fibers.

13. A cartridge filter containing non-woven fabric converted into a cylindrical shape for use as the filter element, the filter element being permeable in the radial direction and comprising:

a top layer made of fibers having a first titer and bordering on the upstream side of the filter and having a thickness of between 10%–60% of the overall thickness of the non-woven fabric;

a bottom layer made of fibers having a second titer and bordering on the downstream side of the filter and having a thickness of between 10% to 60% of the overall thickness of the non-woven fabric, said second layer being compressed between two to ten times the first layer, the non-woven fabric having an overall mass per unit area of 100 to 500 g/m², and an overall thickness, as measured according to DIN 53 855, of 1.5–7.0 mm; and one or more transition zones intermediate the first and second layers, the transition z-ones being formed integral with the first and the second layers so that these layers need not be separately joined together, wherein the top layer, the bottom layer, and the transition zone comprise 100% of the thickness of the filter element; wherein the fibers are bonded together by a thermally softenable binding agent to form the non-woven fabric, which is cylindrical in shape and which is pleated parallel to the cylindrical axis of its shape, and wherein the filter element is useable in air-supply filtration with initial pressure losses of less than 300 Pa at air flow rates through the filter medium of less than 250 m³/m²h.

14. A filter as in claim 13, containing one or more additional layers of fibers with differing titers, intermediate to the top and bottom layers.

15. A cylindrical filter as set forth in claim 13, wherein the top fiber layer is comprised of polyester fibers having a titer of 3 to 6 decitex and the bottom fiber layer is comprised of polyester fibers having a titer of 0.5 to 3.0 decitex.

16. A filter as in claim 15, wherein the binding agent is in the form of bi-component fibers.

17. A cylindrical filter made of non-woven fabric for use as the filter element in a cartridge filter, the filter element being permeable in the radial direction and comprising:

a first layer made of fibers having a first titer and bordering on the upstream flow side of the filter and having a thickness of between 10%–60% of the overall thickness of the non-woven fabric;

a second layer made of fibers having a second titer and bordering on the downstream side of the filter and having a thickness of between 10% to 60% of the overall thickness of the non-woven fabric, said second layer being compressed between two to ten times the first layer, the non-woven fabric having an overall mass per unit area of 100 to 500 g/m2, and an overall thickness, as measured according to DIN 53 855, of 1.5–7.0 mm; and a transition zone intermediate the first and second layers, the transition zone being formed integral with the first and the second layers such that the full cross-section of the filter as viewed parallel to the transition zone is available to filter gas, wherein the first layer, the second layer, and the transition zone comprise 100% of the thickness of the filter element;

wherein the fibers are bonded together by a thermally softenable binding agent to form the non-woven fabric, which is cylindrical in shape and which is pleated parallel to the cylindrical axis of its shape, and wherein the filter element is useable in air-supply filtration with initial pressure losses of less than 300 Pa at gas flow rates through the filter medium of less than 250 m³/m²h.

* * * * *